March 4, 1952  R. N. STRAEHL  2,587,785
RAIL FLAW DETECTOR MECHANISM
Filed Nov. 26, 1949  3 Sheets-Sheet 1
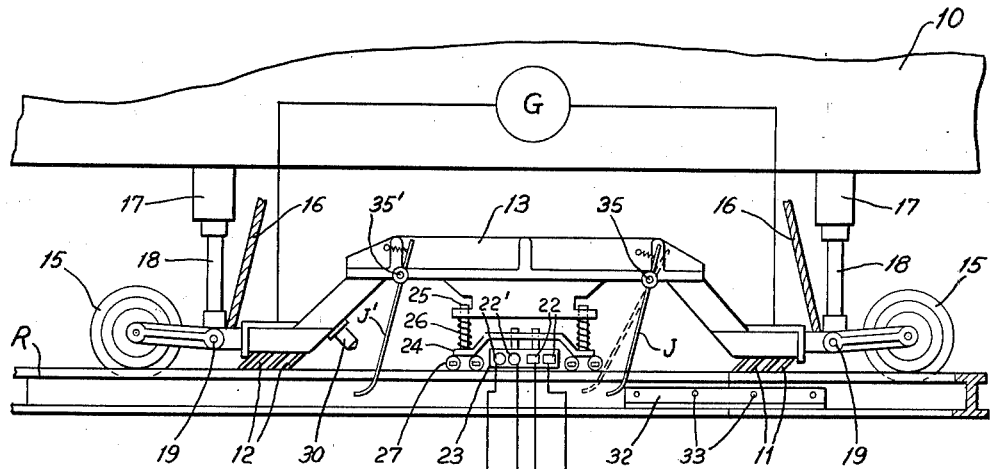
FIG.1
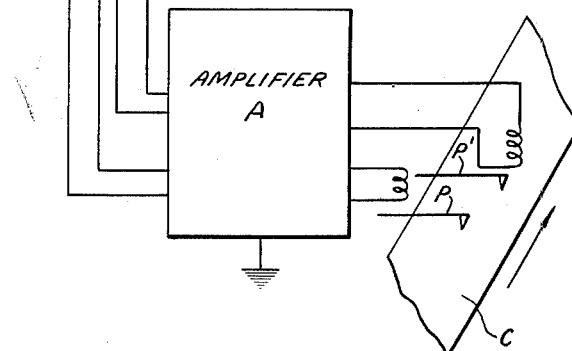
INVENTOR.
ROBERT N. STRAEHL
BY
ATTORNEY March 4, 1952     R. N. STRAEHL     2,587,785
RAIL FLAW DETECTOR MECHANISM
Filed Nov. 26, 1949     3 Sheets-Sheet 2

INVENTOR.
ROBERT N. STRAEHL
BY
ATTORNEY

Patented Mar. 4, 1952

2,587,785

UNITED STATES PATENT OFFICE 2,587,785

RAIL FLAW DETECTOR MECHANISM

Robert N. Straehl, Danbury, Conn., assignor to Sperry Products, Inc., Danbury, Conn., a corporation of New York Application November 26, 1949, Serial No. 129,579

17 Claims. (Cl. 175—183)

This invention relates to rail flaw detector mechanisms of the types wherein it is desired to cut out indications at the rail joints due to the distortions which such joints introduce. One such type of rail flaw detector mechanism is that employed on the Sperry rail flaw detector car which operates upon the principle of energizing the rail with flux, as, for instance, by passing current through the rail to establish an electromagnetic field surrounding the same and exploring said field by inductive means to discover any irregularities caused by the presence of fissures or other discontinuities in the rail. In such testing systems it is found that the rail joints which comprise angle bars, bolts, etc., constitute irregularities which will cause variations in the flux in the same manner as an internal fissure. Therefore, as the detector car rides along the rail, the detector mechanism in passing over a rail joint gives rise to a large number of closely bunched indications on a recording tape, which indications are not distinguishable from one another nor from the indications which may be caused by an internal defect in the rail. As a result, should an internal fissure occur in the rail within the region of the angle bar or adjacent to the ends of the angle bar, it would be impossible to distinguish such fissure from any other indications. Therefore, it has been the practice to provide means for rendering the indicating mechanism ineffective for a period just prior to the time when the flux responsive means reaches the angle bar and until said flux responsive means has passed a similar distance beyond the leaving end of the angle bar.

Various types of joint cutout means have been employed, such as, for instance, pivoted joint fingers which ride along the gauge side of the rail in advance and to the rear of the flux responsive means, said fingers being adapted to close a circuit when they engage the angle bar, to actuate a relay mechanism which renders the indicating means ineffective. Another form of joint cutout mechanism comprises a pair of potential contacts which respond to the sharp increase in voltage drop at the rail ends, which increase in potential again actuates a relay mechanism to render the indicator ineffective. In such of these forms of joint responsive means it will be seen that a relay employing moving parts and subject to vibration is employed. Such relay is relatively slow in response and cannot be sensitively adjusted. The operating time of the relay does not vary with the variations in speed of the car and thus introduces an error in the cutout time phase.

It is therefore one of the principal objects of this invention to provide a joint cutout mechanism for the indicating means which does not employ relays having mechanically movable parts, which is not subject to vibration and which may be sensitively adjusted so that the joint cutout can be rendered effective and ineffective with a high degree of reliability.

Since the time it takes for the flux responsive means to reach a joint after the joint engaging means reaches the joint is a function of the speed of the car, means must be provided for taking care of this variable time element. It is a further object of this invention to provide means whereby this adjustment is automatically made in response to the speed of travel of the detector car.

Further objects and advantages of this invention will become apparent in the following detailed description thereof.

In the accompanying drawings,

Fig. 1 is a side elevation of a portion of a rail fissure detector car having my invention applied thereto and showing diagrammatically the indicating mechanism.

Figure 2:
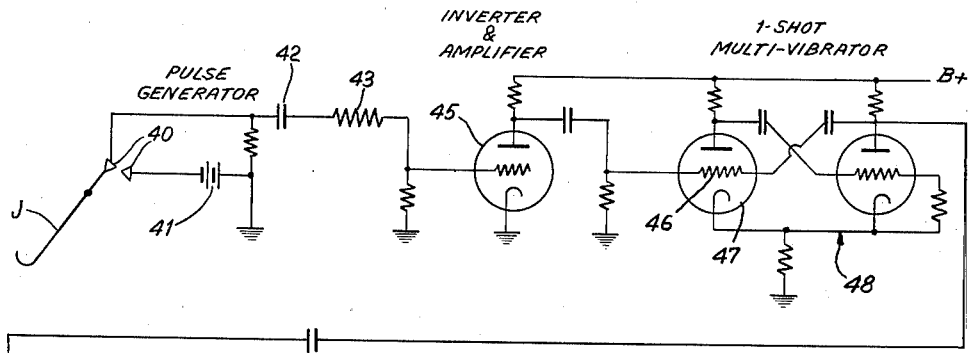
Fig. 2 is a detailed wiring diagram showing one form of my invention adapted to be actuated from a single joint responsive means.
Figure 2:
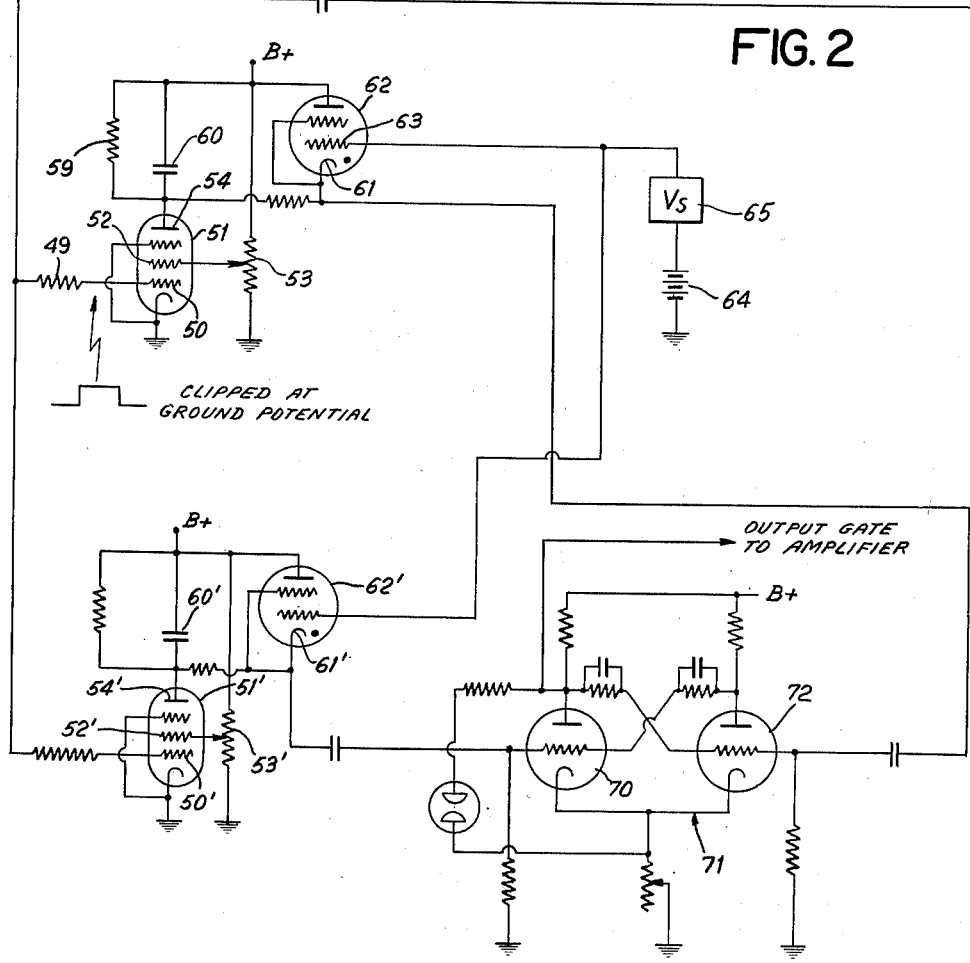

Referring to Fig. 1 of the drawings, there are shown the parts of a standard Sperry rail fissure detector car which includes a car body 10 operating along the rails R. Fissure detection is accomplished by energizing the rail with flux by passing a current through each rail from a generator G within the car body, supplying current to spaced current brushes 11 and 12 supported upon the current brush carriage 13 which when in lowered or effective position is adapted to ride upon the rail by means such as wheels 15. The current brush carriage 13 is normally held in elevated or ineffective position by means of springs, not shown, and cables 16, but when it is desired to lower said carriage, fluid pressure such as compressed air is supplied to the cylinders 17 to force out pistons 18 which are pivotally connected at 19 to the current brush carriage 13. The current passed through the rail by way of spaced brushes 11 and 12 will establish an electromagnetic field surrounding the rail and this field will be uniform except in the region of flaw where it will be distorted. Such distortions of the electromagnetic field are detected by a flux responsive mechanism which may take the form of a plurality of pairs of opposed induction coils 22, 22' supported in a housing 23 at a constant distance above the rail surface by means of a carriage 24. Said carriage 24 is mounted on current brush carriage 13 by means of loosely fitting bolts 25 and springs 26 to permit said carriage 24 while riding on the rail on means such as wheels 27 to move independently of carriage 13 so that said carriage 24 may at all times maintain parallelism with the rail surface regardless of irregularities thereof. The coils 22, 22' normally cut the same number of lines of force, but on entering a region of flaw, first one coil of each pair and then the other will cut a different number of lines of force to generate a differential E. M. F. which after being amplified by amplifier A may be caused to actuate pens P. and P' operating on a chart C. At the same time that the pens are actuated there is actuated also marking means which may take the form of a paint gun 30 mounted on the current brush carriage 13 a sufficient distance behind the flux responsive members 22 and 22' to compensate for the movement of the car and for the lag in operation of the paint gun.

As stated in the introduction hereto, the joints which hold the rails together comprise angle bars 32, bolts 33, and additional members, all of which serve to deflect the current passing through the rails and vary the electromagnetic field surrounding the same. The irregularities of the angle bar will cause the detector coils to pick up a large number of variations in the electromagnetic field and this in turn will cause the pens to record upon the chart C a large number of closely bunched indications. Since the current deflection caused by the angle bar commences a considerable distance in advance of the bar and extends its influence for a similar distance beyond the leaving end of the bar, it will be understood that there is a considerable portion of rail within which it will be difficult to discover any internal defects because any indication of variation in flux caused by the internal defect will be merged with, and be indistinguishable from, the large number of indications set up by the angle bar within the region affected thereby. Therefore it has been the practice heretofore to provide mechanism for cutting out the operation of the indicating means during the interval that the flux responsive means are passing through the region affected by the rail joint. Such cutout means may take the form of a joint finger J pivoted on the carriage 13 at 35 and positioned in sliding engagement with the gauge side of the rail so that it will strike the angle bar and be turned about its pivot. This movement of the joint finger J has heretofore been caused to energize a relay which rendered the indicating means ineffective. The finger J was positioned sufficiently in advance of the flux responsive means so as to cut out the indicating means just before the flux responsive means reached the region of flux affected by the joint. A similar joint finger J' pivoted at 35' was provided to the rear of the flux responsive means and adapted to engage the angle bar before joint finger J left the bar so as to maintain the indicating means ineffective until the flux responsive means had passed beyond the region of flux affected by the joint.

Instead of the relay mechanism heretofore employed I provide, for the reasons set forth in the introduction hereto, the following electronic cutout system which dispenses with the use of relays while securing the advantages of quick response, reliable operation, and automatic adjustment to the speed of the detector car. I have shown two such systems, the first in Fig. 2 utilizing only the single joint responsive means, such as joint finger J, and dispensing with the second joint responsive means, such as joint finger J'. In the Fig. 3 form of the invention I show how my system can be utilized on connection with the two joint fingers J and J' as disclosed in Fig. 1.

Figure 3:
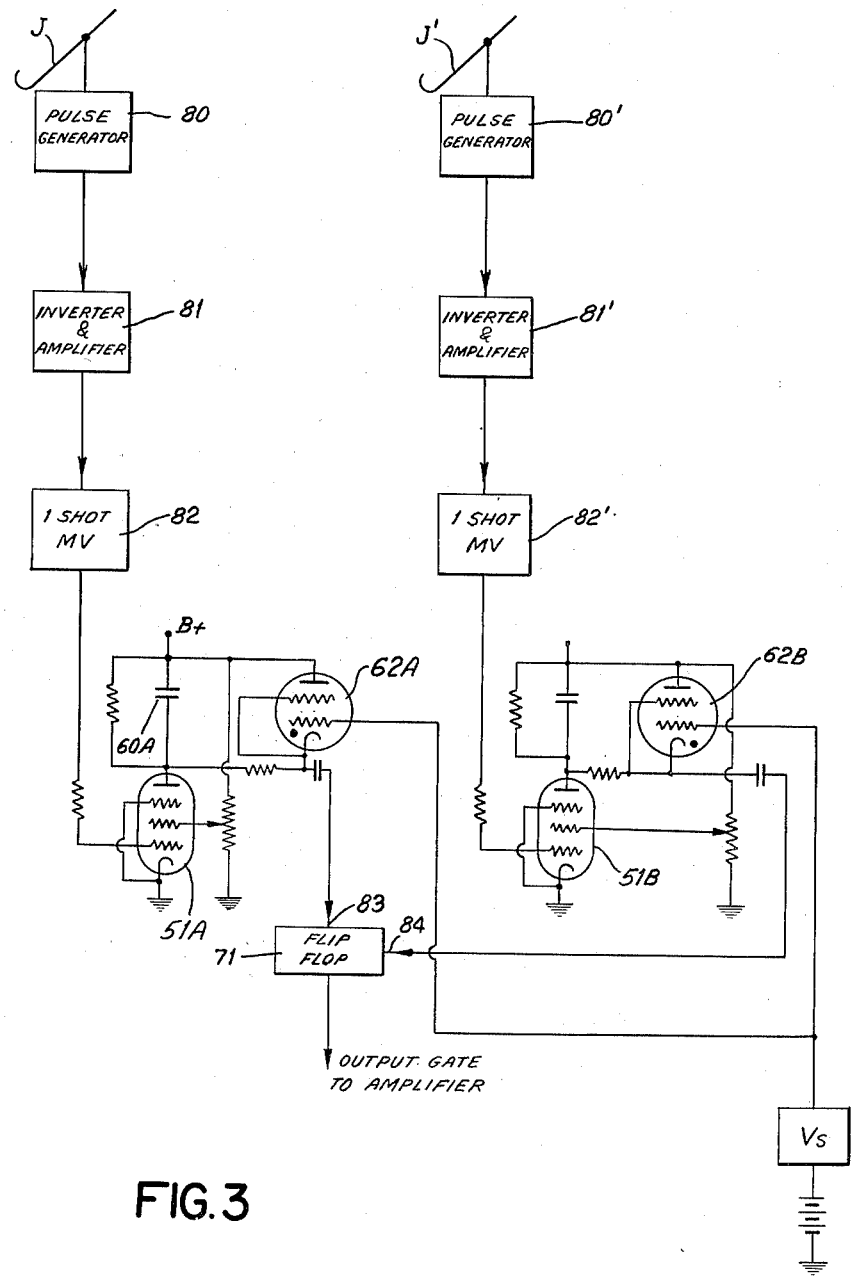
Fig. 3 is a view similar to Fig. 2 showing my invention adapted to be actuated from a pair of joint responsive means.

Referring first to the Fig. 2 form which operates entirely from the single leading joint finger J, I have shown said joint finger as closing a set of contacts 40 in response to engagement of the finger with the angle bar. Said contacts 40 close a circuit which includes a source 41 and is so connected as to generate a negative pulse which is then applied through capacitor 42 and resistor 43 to an inverter and amplifier tube 45 whose output will then be magnified positive pulse. This positive pulse is applied to the grid 46 of the left-hand tube 47 of a one-shot multivibrator indicated generally at 48 whose output then initiates the joint cutout action as follows:

The magnified positive pulse from the one-shot multivibrator is applied through a relatively large resistor 49 to the grid 50 of a pentode tube 51. A large positive voltage is applied to the grid 52 of the pentode from the B+ source through a variable resistor 53. The tube is normally non-conducting, but when the large positive pulse from the multivibrator 48 is applied to the grid 50, the tube starts conducting and permits a capacitor 60 to begin charging. The resistor 59 normally drains off any previous charge on capacitor 60. Prior to rendering tube 51 active, both sides of the capacitor 60 are at B+ potential at both sides, but when the tube 51 is rendered conductive, the capacitor commences to charge. The rate of charging may be controlled by the voltage applied to electrode 52 through variable resistor 53, thus determining the pentode plate current.

The charging of the capacitor 60 is caused to reduce the voltage on plate 54 of tube 51 and also is caused to reduce the voltage of cathode 61 of a gas discharge or trigger tube 62. After a predetermined interval of time, depending on the rate of charging of condenser 60, and therefore the rate of lowering of positive voltage on cathode 61, the trigger tube 62 will fire to generate a pulse which is caused to render the indicator amplifier ineffective in the following manner: The output from tube 62 is applied to the grid of the right-hand tube 72 of a flip-flop circuit indicated generally at 71 to cause a pulse to be generated, which pulse may be applied to one of the output stages of the indicator amplifier to render the amplifier ineffective.

In order to prevent multiple firing of the gas discharge tube throughout the period during which the flux responsive means is passing over the angle bar region, the minimum current flowing through tube 51 must exceed the value of current which would permit tube 62 to deionize.

The adjustment 53 permits setting the exact time of cutout of the leading flux responsive coils after the joint responsive means has engaged the joint.

A variable time elapses between the time that the joint finger J engages the angle bar and the time that the flux responsive means reaches the region of flux affected by the angle bar. This time is inversely proportional to the speed since the faster the car is moving the sooner will the flux responsive means reach the joint region. In order to make the point of cutout of the indicator responsive to the speed of the car, there is applied to a control grid 63 of tube 62 a fixed voltage 64 plus a variable voltage Vs indicated at 65 which may be a voltage generated from the car axle so that the voltage is a function of the car speed. Therefore the amount of positive voltage which is applied to control grid 63 will be a function of speed and therefore the tube 62 will fire sooner, after joint finger J engages the angle bar, when the car is traveling fast than when the car is traveling slow and the time interval which elapses will be a function of the speed of the car.

The indicator must be kept in ineffective condition until the flux responsive means has passed beyond the region of flux affected by the joint. This time interval may be determined in either of two ways. In Fig. 2 I have disclosed how the single leading joint finger J can control both the point of rendering the indicator ineffective and the point of rendering it again effective. In this form of the invention the output of the one-shot multivibrator 48 is applied simultaneously to the grid 50' of a second tube 51' similar to tube 51. The B+ voltage is again applied to grid 52' through resistor 53'. The two tubes 51 and 51' will thus be rendered conductive simultaneously and capacitors 60 and 60' will commence charging. The capacitor 60' being of greater capacity than capacitor 60, the tube 62' will fire later than tube 62. The time interval that elapses between the firing of tube 62 and the firing of tube 62' may be controlled by the adjustable resistor 53' which will control the rate of charging of capacitor 60'. The time interval between firing of the tube 62 and 62' is selected to be such that it corresponds to the passage of the flux responsive means through the entire region of flux affected by the joint. The firing of tube 62' produces a pluse which is applied to the left-hand tube 70 of the flip-flop circuit 71 to restore the same to its original condition and thus render the indicator amplifier again effective.

The constants of the multivibrator 48 are such as to keep it actuated for the longest period during which the indicator is to be maintained ineffective.

In the above described Fig. 2 form of the invention the period during which the indicator was rendered ineffective was determined by two similar circuits simultaneously energized from the one-shot multivibrator 48 but said circuits having different time constants so that tube 62' fired a predetermined time interval after tube 62. In the form of the invention disclosed in Fig. 3 I employ the two joint responsive members J and J' as shown in Fig. 1 with two similar circuits of similar constants, each comprising a pulse generator, inverter and amplifier and one-shot multivibrator, each multivibrator controlling the respective gas discharge tube circuit. Thus joint responsive member J energizes pulse generator 80, inverter and amplifier 81, one-shot multivibrator 82, which renders tube 51-A conductive to charge condenser 60-A to cause discharge of tube 62-A. This generates a pulse which is applied at 83 to one tube of the flip-flop circuit 71 to initiate the pulse which renders the indicator amplifier ineffective. When the trailing joint responsive member J' leaves the angle bar it is caused to energize a pulse generator 80', inverter and amplifier 81', one-shot multivibrator 82' to render tube 51-B conductive to cause discharge of trigger tube 62-B whose output is applied at 84 to the other tube of the flip-flop circuit 71 to cut off the output of the circuit and render the indicator amplifier again effective.

Having described my invention, what I claim and desire to secure by Letters Patent is:

1. In a rail flaw detector car having driving means adapted to move the car over rails connected by joints, said car having means for energizing the rail with flux, means responsive to variations in said flux caused by defects in the rail, indicating means including an electronic amplifier actuated by said responsive means, said responsive means responding also to variations in flux caused by the joint, means responsive to joints, means actuated by said last-named responsive means for generating an electrical pulse when said flux responsive means approaches the region of flux affected by the joint, a flip-flop circuit for generating and cutting off voltages, said circuit being connected to said amplifier to render it effective and ineffective, and means whereby said electrical pulse actuates said flip-flop circuit in a direction to render said amplifier ineffective.

2. A device as specified in claim 1, characterized by means responsive to said second joint responsive means for generating a second electrical pulse when the flux responsive means has passed beyond the region of flux affected by the joint, and mean whereby said second electrical pulse actuates said flip-flop circuit in the opposite direction to render said amplifier effective.

3. In a rail flaw detector car having driving means adapted to move the car over rails connected by joints, said car having means for energizing the rail with flux, means responsive to variations in said flux caused by defects in the rail, indicating means including an electronic amplifier actuated by said responsive means, said responsive means responding also to variations in flux caused by the joint, means responsive to the joint and positioned in advance of the flux responsive means, means whereby said second joint responsive means generates an electrical pulse when the flux responsive means approaches the region of flux affected by the joint, a flip-flop circuit for generating and cutting off voltages, said circuit being connected to said amplifier to render it effective and ineffective, and means whereby said electrical pulse actuates said flip-flop circuit in a direction to render said amplifier ineffective.

4. A device as specified in claim 3 characterized by means responsive to said second joint responsive means for generating a second electrical pulse when the flux responsive means has passed beyond the region of flux affected by the joint, and means whereby said second electrical pulse actuates said flip-flop circuit in the opposite direction to render said amplifier effective.

5. In a rail flaw detector car having driving means adapted to move the car over rails connected by joints, said car having means for energizing the rail with flux, means responsive to variations in said flux caused by defects in the rail, indicating means including an electronic amplifier actuated by said responsive means, said responsive means responding also to variations in flux caused by the joint, means responsive to the joint and positioned in advance and to the rear of the flux responsive means, means whereby said second joint responsive means generates electrical pulses when the flux responsive means approaches and leaves the region of flux affected by the joint, a flip-flop circuit for generating and cutting off voltages, said circuit being connected to said amplifier for rendering said amplifier effective and ineffective, and means whereby said electrical pulses actuate said flip-flop circuit in directions to render said amplifier ineffective and effective, respectively.

6. In a rail flaw detector car having driving means adapted to move the car over rails connected by joints, said car having means for energizing the rail with flux, means responsive to variations in said flux caused by defects in the rail, indicating means including an electronic amplifier actuated by said responsive means, said responsive means responding also to variations in flux caused by the joint, a pair of pivoted fingers positioned in advance and to the rear of the flux responsive means and adapted to be actuated in response to the joint, means controlled by the leading finger for generating an electrical pulse when the leading finger engages the joint, means controlled by the trailing finger for generating an electrical pulse when the trailing finger leaves the joint, a flip-flop circuit for generating and cutting off voltages, said circuit being connected to said amplifier for rendering said amplifier effective and ineffective, and means whereby said electrical pulses actuate said flip-flop circuit in directions to render said amplifier ineffective and effective, respectively.

7. A device as specified in claim 1 in which the means for actuating the flip-flop circuit comprises time delay means, and a one-shot multivibrator actuated by said electrical pulse for energizing the time delay means.

8. A device as specified in claim 1 in which the means for actuating the flip-flop circuit comprises time delay means, a one-shot multivibrator actuated by said electrical pulse for energizing the time delay means, and means for varying the time delay means corresponding to the interval of time required for the flux responsive means to reach the region of flux affected by the joint after the second joint responsive means has reached the joint.

9. A device as specified in claim 1 in which the means for actuating the flip-flop circuit comprises time delay means including a gas discharge tube and a capacitor for controlling the time of discharge of the tube, normally ineffective means for controlling the charging of the capacitor, and a one-shot multivibrator actuated by said electrical pulse for rendering said control means effective.

10. A device as specified in claim 1 in which the means for actuating the flip-flop circuit comprises time delay means including a gas discharge tube and a capacitor for controlling the time of discharge of the tube, normally ineffective means for controlling the charging of the capacitor, a one-shot multivibrator actuated by said electrical pulse for rendering said control means effective, and means for varying the time delay means corresponding to the interval of time required for the flux responsive means to reach the region of flux affected by the joint after the second joint responsive means has reached the joint.

11. A device as specified in claim 1, characterized by means responsive to the second joint responsive means for generating a second electrical pulse when the flux responsive means has passed beyond the region of flux affected by the joint, means whereby said second electrical pulse actuates said flip-flop circuit in the opposite direction to render said amplifier effective, the means whereby said first and said second electrical pulses actuate said circuit each comprising time delay means including a gas discharge tube and a capacitor for controlling the time of discharge of the tube, normally ineffective means for controlling the charging of the capacitor, and a one-shot multivibrator actuated by the electrical pulse for rendering the control means effective.

12. A device as specified in claim 1, characterized by means responsive to the second joint responsive means for generating a second electrical pulse when the flux responsive means has passed beyond the region of flux affected by the joint, means whereby said second electrical pulse actuates said flip-flop circuit in the opposite direction to render said amplifier effective, the means whereby said first and said second electrical pulses actuate said circuit each comprising time delay means including a gas discharge tube and a capacitor for controlling the time of discharge of the tube, normally ineffective means for controlling the charging of the capacitor, and a one-shot multivibrator actuated by the electrical pulse for rendering the control means effective, the capacitor controlled by the second electrical pulse being of greater capacity to cause the second gas discharge tube to discharge a predetermined time after the discharge of the first gas discharge tube.

13. A device as specified in claim 1 in which the means for actuating the flip-flop circuit comprises time delay means including a gas discharge tube and a capacitor for controlling the time of discharge of the tube, normally ineffective means for controlling the charging of the capacitor, a one-shot multivibrator actuated by said electrical pulse for rendering said control means effective, a control grid for the gas tube, voltage supplying means responsive to the speed of the car, and means for supplying said voltage to the control grid whereby the time delay in firing of the gas tube will be a function of the speed of the car.

14. A device as specified in claim 1, characterized by means responsive to the second joint responsive means for generating a second electrical pulse when the flux responsive means has passed beyond the region of flux affected by the joint, means whereby said second electrical pulse actuates said flip-flop circuit in the opposite direction to render said amplifier effective, the means whereby said first and said second electrical pulses actuate said circuit each comprising time delay means including a gas discharge tube and a capacitor for controlling the time of discharge of the tube, normally ineffective means for controlling the charging of the capacitor, a one-shot multivibrator actuated by the electrical pulse for rendering the control means effective, a control grid for the gas tube, voltage supplying means responsive to the speed of the car, and means for supplying said voltage to the control grid whereby the time delay in firing of the gas tube will be a function of the speed of the car.

15. A device as specified in claim 1, characterized by means responsive to the second joint responsive means for generating a second electrical pulse when the flux responsive means has passed beyond the region of flux affected by the joint, means whereby said second electrical pulse actuates said flip-flop circuit in the opposite direction to render said amplifier effective, the means whereby said first and said second electrical pulses actuate said circuit each comprising time delay means including a gas discharge tube and a capacitor for controlling the time of discharge of the tube, normally ineffective means for controlling the charging of the capacitor, a one-shot multivibrator actuated by the electrical pulse for rendering the control means effective, a control grid for the gas tube, voltage supplying means responsive to the speed of the car, and means for supplying said voltage to the control grid whereby the time delay in firing of the gas tube will be a function of the speed of the car, the capacitor controlled by the second electrical pulse being of greater capacity to cause the second gas discharge tube to discharge a predetermined time after the discharge of the first gas discharge tube.

16. A device as specified in claim 1, characterized by means responsive to the second joint responsive means for generating a second electrical pulse when the flux responsive means has passed beyond the region of flux affected by the joint, means whereby said second electrical pulse actuates said flip-flop circuit in the opposite direction to render said amplifier effective, the means whereby said first and said second electrical pulses actuate said circuit each comprising time delay means including a gas discharge tube and a capacitor for controlling the time of discharge of the tube, normally ineffective means for controlling the charging of the capacitor, a one-shot multivibrator actuated by the electrical pulse for rendering the control means effective, a control grid for the gas tube, voltage supplying means responsive to the speed of the car, means for supplying said voltage to the control grid whereby the time delay in firing of the gas tube will be a function of the speed of the car, the capacitor controlled by the second electrical pulse being of greater capacity to cause the second discharge tube to discharge a predetermined time after the discharge of the first gas discharge tube, and means for varying said predetermined time.

17. A device as specified in claim 1 in which the means for actuating the flip-flop circuit comprises time delay means including a gas discharge tube and a capacitor for controlling the time of discharge of the tube, normally ineffective means for controlling the charging of the capacitor, a one-shot multivibrator actuated by said electrical pulse for rendering said control means effective, and means for controlling the rate of charging of the capacitor.

ROBERT N. STRAEHL.

REFERENCES CITED

The following references are of record in the file of this patent:

UNITED STATES PATENTS

| Number | Name | Date |
|---|---|---|
| 2,472,784 | Barnes et al. | June 14, 1949 |
| 2,481,858 | Mesh | Sept. 13, 1949 |